United States Patent [19]

Howald

[11] Patent Number: 4,586,328
[45] Date of Patent: May 6, 1986

[54] COMBUSTION APPARATUS INCLUDING AN AIR-FUEL PREMIXING CHAMBER

[76] Inventor: Werner E. Howald, 5970 Crabtree La., Cincinnati, Ohio 45243

[21] Appl. No.: 377,128

[22] Filed: May 11, 1982

Related U.S. Application Data

[60] Continuation of Ser. No. 93,260, Nov. 13, 1979, abandoned, which is a continuation of Ser. No. 877,897, Feb. 15, 1978, abandoned, which is a division of Ser. No. 707,326, Jul. 21, 1976, Pat. No. 4,084,371, which is a continuation of Ser. No. 491,611, Jul. 24, 1974, abandoned.

[51] Int. Cl.⁴ .......................... F02C 9/00; F02G 3/00
[52] U.S. Cl. ..................... 60/39.29; 60/732; 60/737
[58] Field of Search ............. 60/732, 737, 39.23, 60/39.29

[56] References Cited

U.S. PATENT DOCUMENTS

| | | | |
|---|---|---|---|
| 2,446,059 | 7/1948 | Peterson et al. | 60/39.23 |
| 2,809,493 | 10/1957 | Pavlecka | 60/39.75 |
| 2,837,893 | 6/1958 | Schirmer | 60/39.23 |
| 3,052,096 | 9/1962 | Pavlecka | 60/39.36 |
| 3,078,672 | 2/1963 | Meurer | 60/39.23 |
| 3,290,880 | 12/1966 | Poyser | 60/39.36 |
| 3,430,443 | 3/1969 | Richardson et al. | 60/738 |
| 3,570,242 | 3/1971 | Leonardi et al. | 60/737 |
| 3,577,878 | 5/1971 | Greenwood et al. | 60/39.29 |
| 3,736,746 | 6/1973 | DuBell et al. | 60/737 |
| 3,859,786 | 1/1975 | Azelborn et al. | 60/39.23 |
| 3,899,881 | 8/1975 | Arvin et al. | 60/737 |
| 3,930,368 | 1/1976 | Anderson et al. | 60/39.23 |
| 4,040,251 | 8/1977 | Heitmann et al. | 60/39.36 |

Primary Examiner—Louis J. Casaregola
Assistant Examiner—Timothy S. Thorpe
Attorney, Agent, or Firm—Wood, Herron & Evans

[57] ABSTRACT

A combustor for generating a hot gas stream by the combustion of fuel in a pressurized airstream is disclosed including a generally toroidal-shaped combustion chamber of relatively short axial length, an annular orifice providing for the entry of a main airstream into the combustion chamber and a premixing chamber for generating and directing a vapor phase air-fuel premixture into the entering main airstream to form a combustible mixture for burning in the combustion chamber. In a preferred form, the mixture burns along a generally toroidal-helical gas flow path. The combustor is particularly suited for use in a gas turbine engine.

19 Claims, 18 Drawing Figures

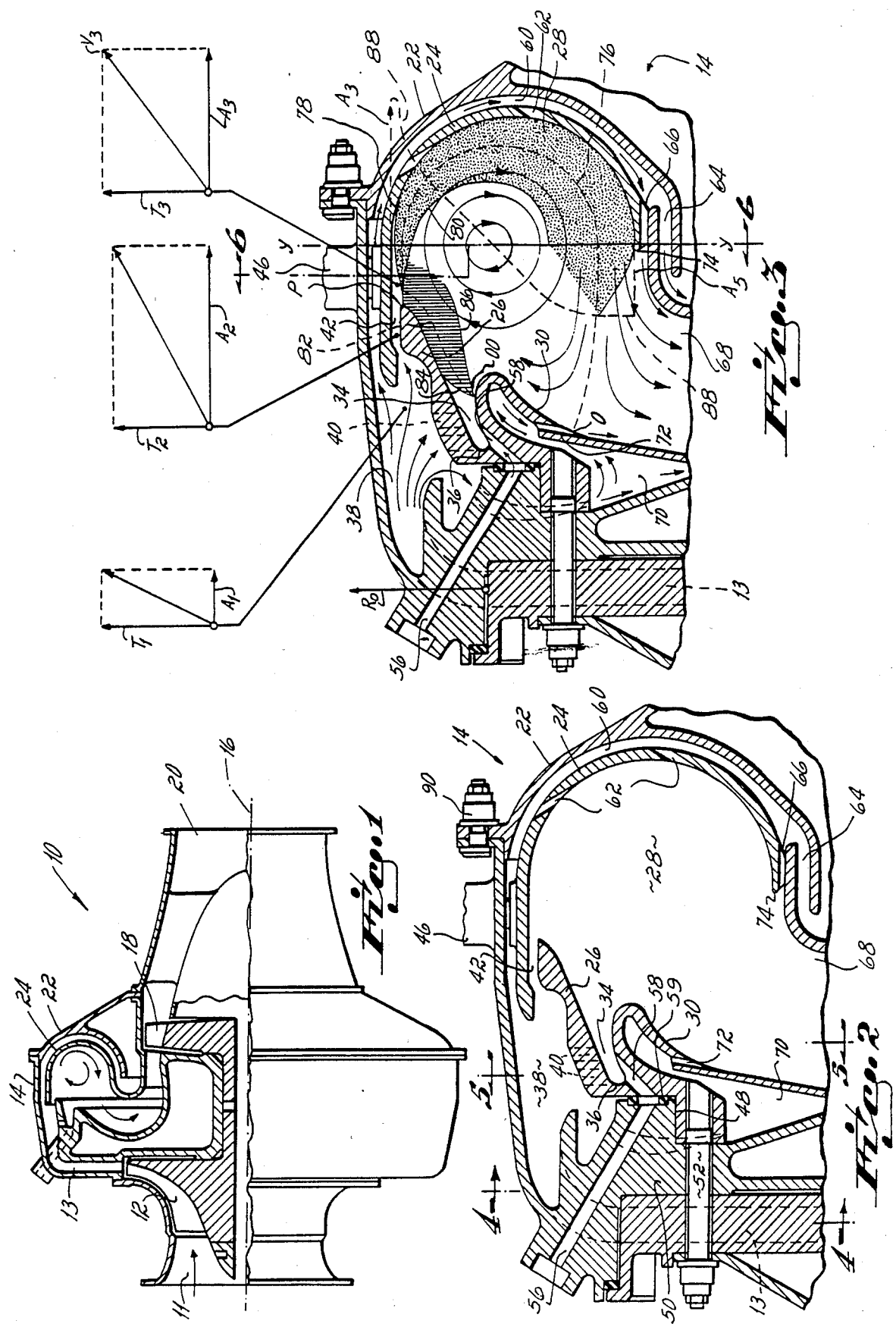

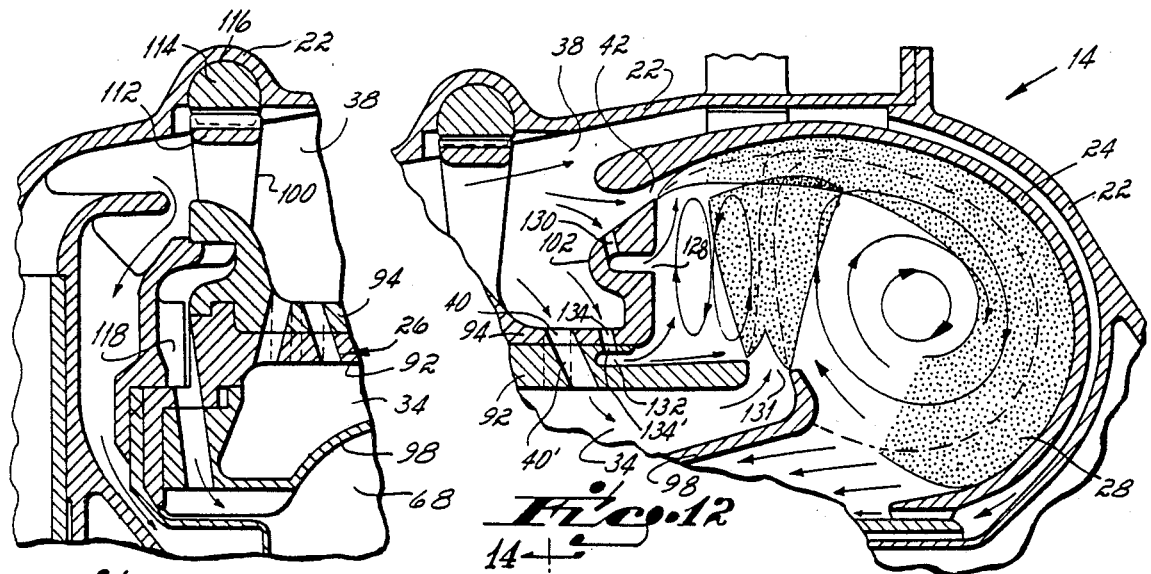
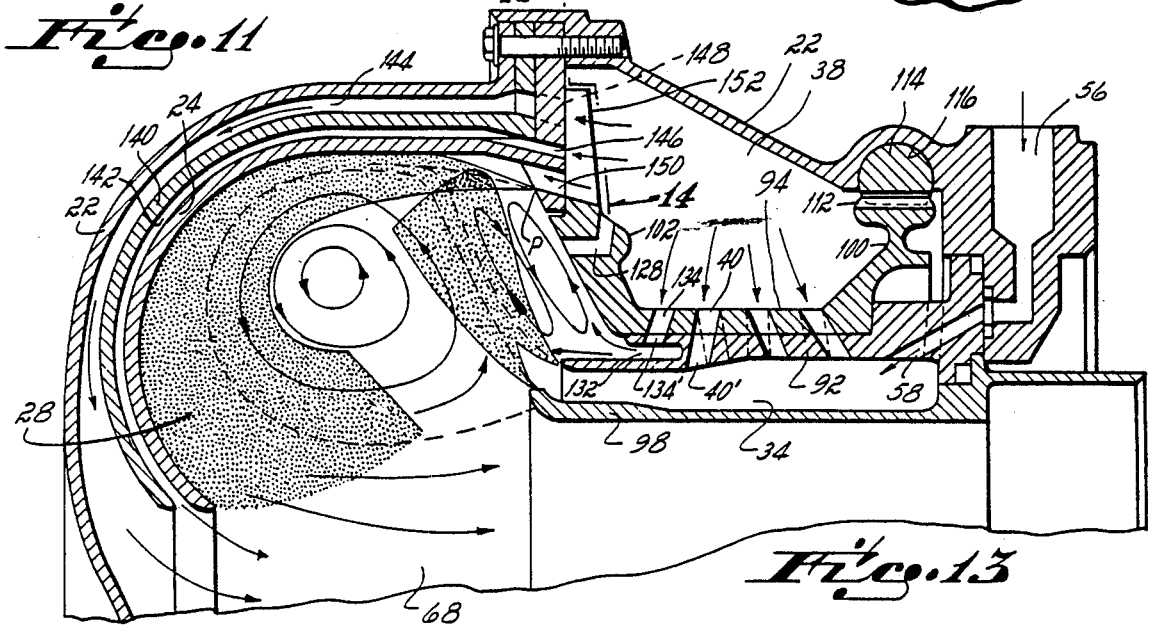
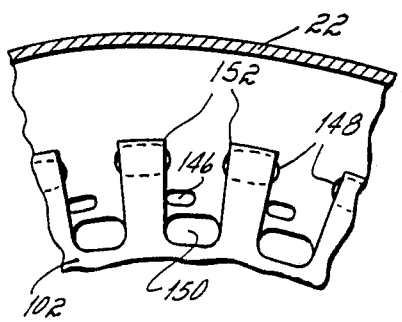

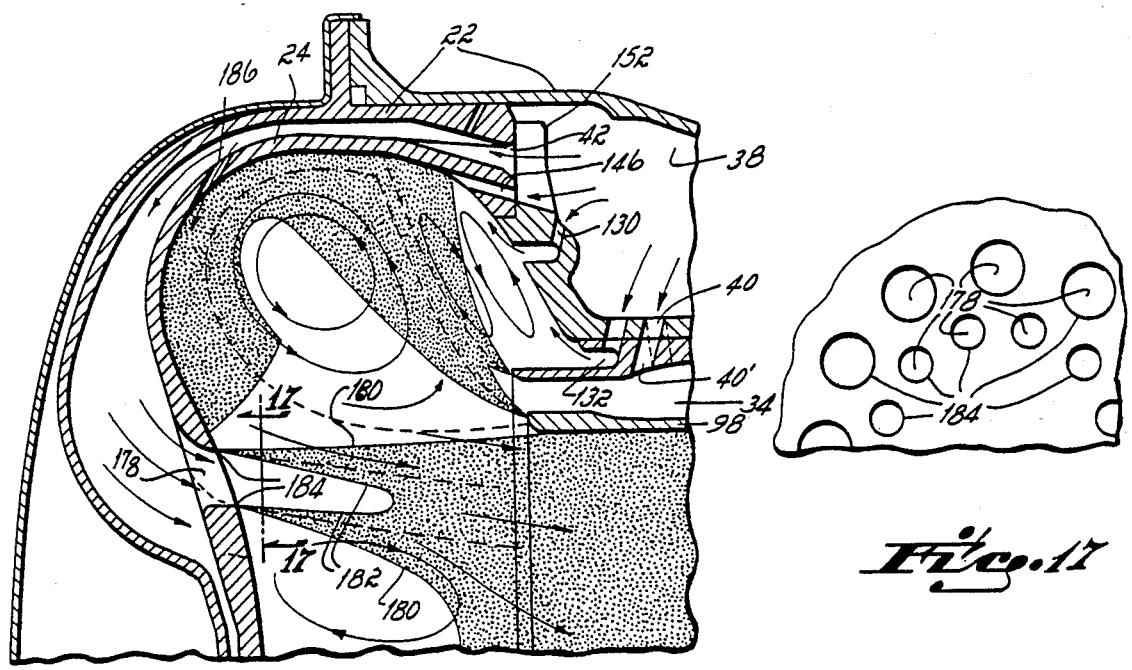
FIG. 15
FIG. 17
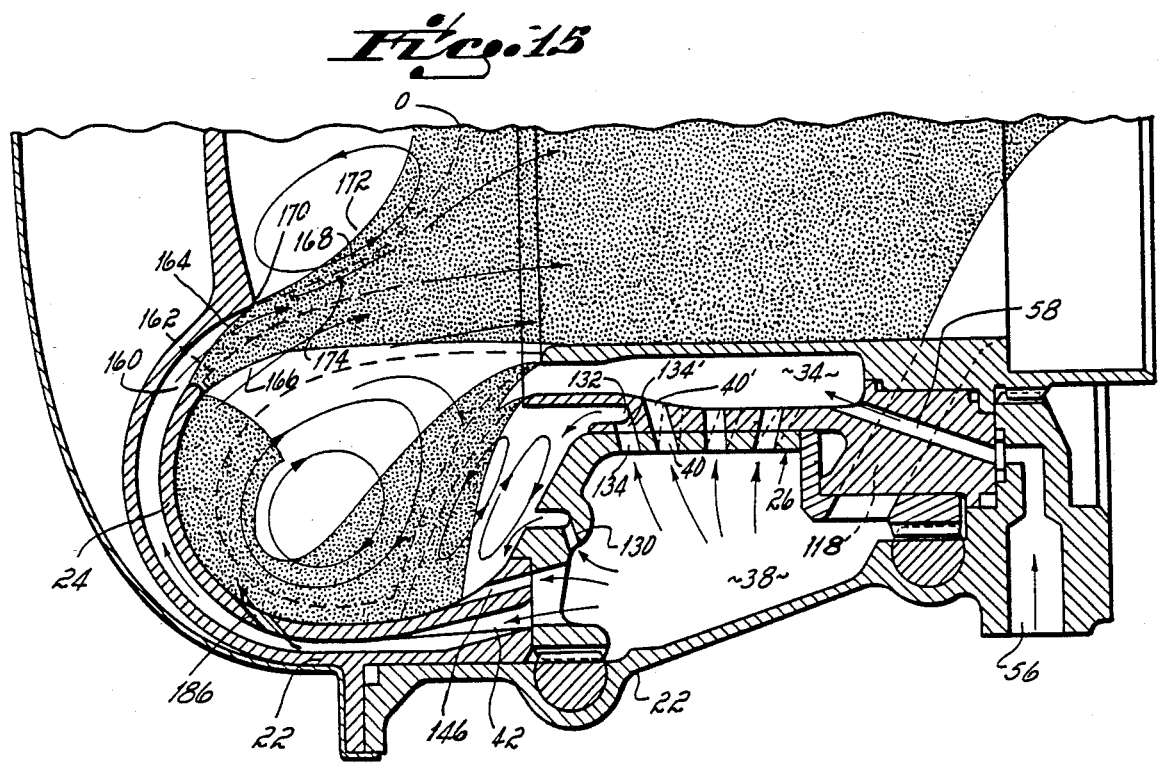
FIG. 16

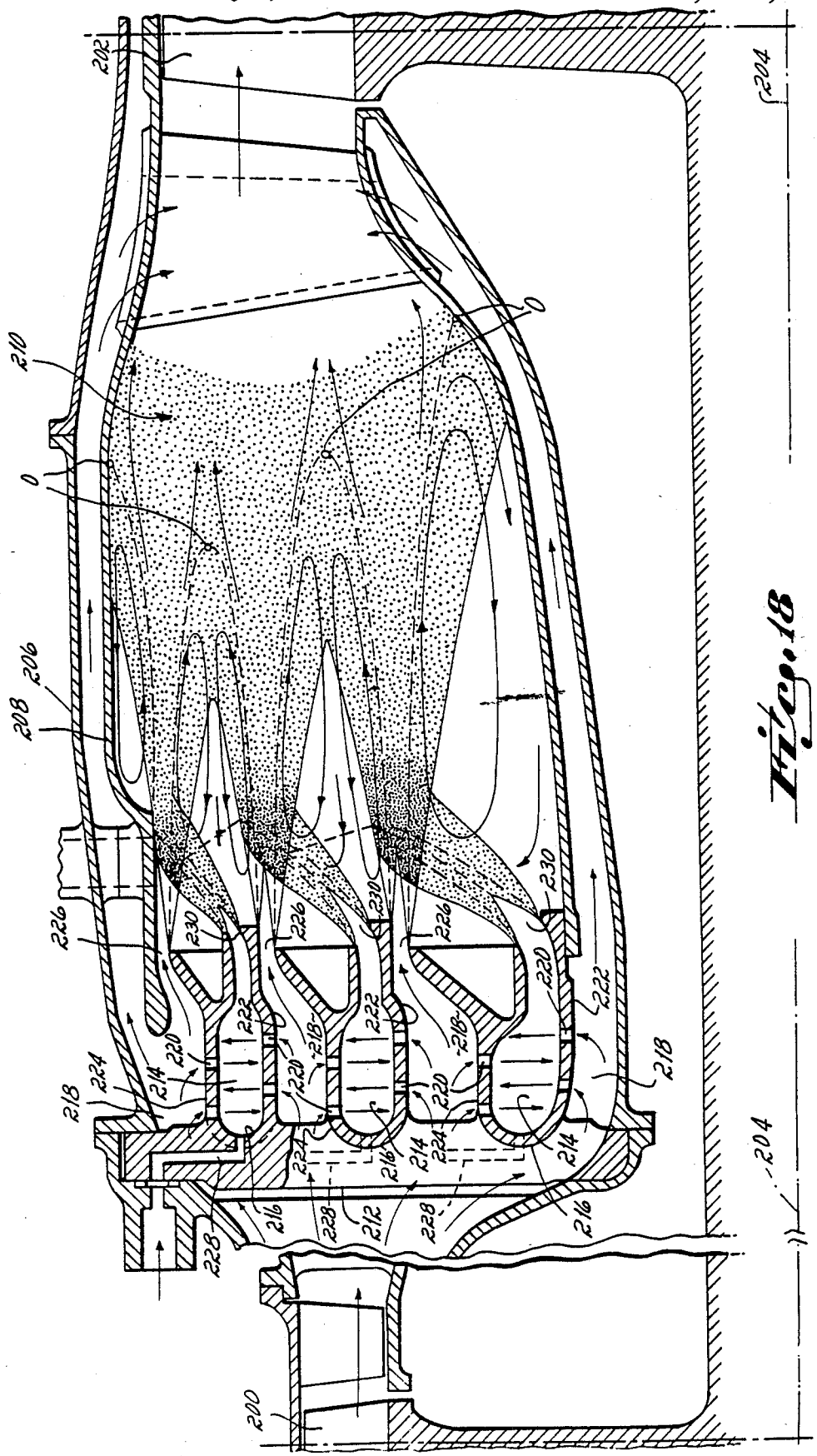

COMBUSTION APPARATUS INCLUDING AN AIR-FUEL PREMIXING CHAMBER

RELATED APPLICATIONS

This application is a continuation of applicant's application Ser. No. 93,260, filed Nov. 13, 1979, which in turn is a continuation of applicant's application Ser. No. 877,897, filed Feb. 15, 1978, both now abandoned, which is in turn a divisional of applicant's application Ser. No. 707,326, filed July 21, 1976, for "Combustion Apparatus Including an Air-Fuel Premixing Chamber", now U.S. Pat. No. 4,084,371 which in turn is a continuation of application Ser. No. 491,611, filed July 24, 1974, for "Combustor", now abandoned.

BACKGROUND OF THE INVENTION

This invention relates to an improved combustor for generating a hot gas stream by the combustion of fuel in a pressurized airstream. More specifically, this invention relates to an improved combustor capable of generating a hot gas stream with minimum heat, pressure and velocity losses and with minimum formation of noxious or undesirable exhaust gas constituents.

The present combustor has a wide range of utility, e.g., in room heating and powerhouse steam generating apparatus and is particularly useful in gas turbine engines of both the stationary industrial type and the propulsive type. Although my invention will be described as it is applicable to gas turbine engines for use in automotive and flight propulsion, it is to be recognized that it is equally applicable to any system where fuel is burned in a pressurized airstream to generate a hot gas stream.

In gas turbine engines there are many desiderata for the combustion of fuel for generating a hot gas stream. For example, for efficiency and economy of operation, a hot gas stream should be generated with minimum heat, pressure and velocity losses. Any pressure drop across the combustor lowers the available pressure drop through the turbine and, consequently, the energy available for conversion to useful work in the turbine. For a given fuel flow, this decreases the turbine horsepower and increases the specific fuel consumption. Second, it is desirable that the hot gas stream be generated with minimum formation of undesirable exhaust gas constituents, e.g., unburned hydrocarbons, carbon monoxide and oxides of nitrogen. Third, it is desirable that a stable flame of controlled temperature achieving complete combustion of the fuel be maintained within the combustor. In addition, all of these desirable operating characteristics should be obtained over a wide range of ambient pressures and temperatures and at rapid changes in fuel and air mass flow rates through the combustor. Moreover, it is highly desirable that the combustor be compact, light and simple to manufacture and maintain.

Efforts to achieve these desiderata in prior art combustors have not been completely successful. Indeed, these prior art combustors have suffered from one or more serious disadvantages. By way of example, reverse flow-type combustors widely used in aviation and industrial gas turbine engines are wrapped around the outer diameter of the turbine to keep the engine short and are therefore relatively large in diameter. In such combustors the fuel must be injected with a high velocity in order to achieve fast and complex mixing and combustion. This turbulence is generated by a significant pressure drop in the combustor and additional pressure drops result from the large housing and liner surfaces and the turns required to direct air into the inside of the liner. Moreover, the hot and cold air layers are far apart and must be brought together for mixing. Thus, the combustor must be relatively long and the fuel injectors must be placed at the far downstream end thereof. Moreover, the large inner surface absorbs a large amount of heat that must be carried away. And finally, in an effort to reduce weight and cost, these large surfaced combustors are welded from sheet metal, with the result that they are particularly susceptible to failure from vibration, thermal stress and stress concentrations. Each of the foregoing is a significant disadvantage.

Accordingly, it is among the principal objects of my invention to provide an improved combustor of compact and simple construction wherein fast and complete mixing of fuel and air and efficient burning is achieved to generate a hot gas stream with minimum heat, pressure and velocity losses.

It is a further object of my invention to provide an improved combustor of relatively short axial length which, nevertheless, provides for relatively long gas flow path lengths and maximum flame stability and burning efficiency with a minimum of heat losses.

It is a still further object of my invention to provide an improved combustor wherein the fuel and pressurized air from the compressor are quickly and completely mixed to provide a substantially homogeneous vapor phase air-fuel premixture which is then thoroughly mixed into a main airstream to produce a combustible air-fuel mixture having a desired air-to-fuel ratio for complete combustion with minimum formation of undesirable exhaust gas constituents.

The present invention is predicated in part upon the concept of providing a combustion chamber in which the flame does not extend in an axial direction, but rather is curved back upon itself in generally the shape of a segment of a toroid. A second important concept of the present invention is to provide a premixing chamber in which an intimate mixture of fuel and air is formed immediately adjacent to the combustion chamber in combination with means for injecting the air-fuel premixture into a main airstream entering the combustion chamber adjacent to the outer periphery thereof with the injected air-fuel premixture having a substantial tangential component such that almost instantaneous, highly localized intermixing of the air-fuel premixture into the main airstream is obtained to generate a combustible air-fuel mixture for burning in the combustion chamber.

In the preferred embodiment of my invention, these and other objects are accomplished by providing a combustor comprising a housing which encloses an arcuate combustor liner effective to constrain the gas flow to form a generally toroidal combustion zone or chamber, an annular air-fuel premixing chamber upstream of, and opening downstream into, the combustion chamber, and a plenum surrounding the premixing chamber for receiving pressurized air from the compressor. The plenum is separated from the air-fuel premixing chamber by a baffle and communicates therewith through a plurality of spaced openings in the baffle angled generally tangentially to the inner surface thereof to provide for the entry of air to generate a vortically flowing, substantially homogeneous vapor phase air-fuel premixture in the premixing chamber. The plenum also communicates with the combustion chamber through an annular orifice circumferential to the baffle at its downstream end to provide a main airstream entering the combustion chamber. In a preferred form, the main airstream has a vector component of flow effective to generate a helical gas flow path through the toroidal-shaped combustion zone. The vortical discharge from the air-fuel premixing chamber enters the main airstream and becomes thoroughly mixed therein, thereby generating a combustible air-fuel mixture having a predetermined air-to-fuel ratio at the entrance to the combustion chamber for burning therein. The toroidal-helical flow of the combustible air-fuel mixture provides a relatively long gas flow path length in a compact housing. The relationship of the flame which surrounds a vortical recirculation zone of burned gases is effective to cause ignition and efficient and stable burning of the mixture.

Other objects and advantages of my invention will be apparent from the following description of a preferred embodiment embodying the present invention and several modifications, reference being had to the accompanying drawings.

DESCRIPTION OF THE DRAWINGS

FIG. 1 is a simplified longitudinal section of a gas turbine engine including the combustor of the present invention.

FIG. 2 is an enlarged cross-section of the combustor shown in FIG. 1.

FIG. 3 is a view of the combustor similar to FIG. 2 illustrating the combustion process occurring therein.

FIG. 11 is a partial cross-sectional view showing a feature of the combustor shown in FIG. 8.

FIG. 12 is a partial cross-sectional view of another embodiment of the invention.

FIG. 13 is a cross-sectional view of another embodiment of the invention.

FIG. 14 is a view taken along line 14—14 of FIG. 13.

FIG. 15 is a partial cross-sectional view of another embodiment of the invention.

FIG. 16 is a cross-sectional view of another embodiment of the invention.

FIG. 17 is a view taken along line 17—17 of FIG. 15.

FIG. 18 is a cross-sectional view of another embodiment of the invention.

DETAILED DESCRIPTION

Figure 4:
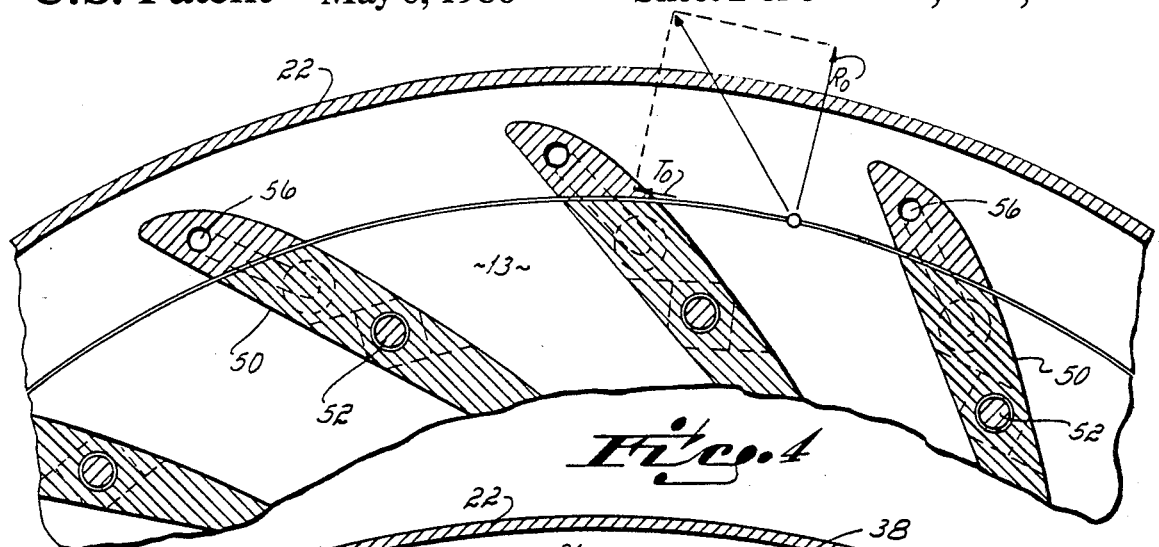
FIG. 4 is a cross-sectional view taken along line 4—4 of FIG. 2.

Referring now to the drawings, FIG. 1 shows the basic elements of a typical aviation gas turbine engine 10 incorporating a combustor of the present invention. Cold, fresh intake air enters an air inlet 11 of the engine 10 and travels to a compressor 12 located at the front end of the engine casing where power is employed to raise the pressure of the intake air. The pressurized intake air emerging from the compressor 12 passes through a diffuser 13 into the combustor 14 where fuel is burned to heat it to a high temperature. As shown in FIG. 1, the combustor 14 is annularly disposed about the longitudinal axis 16 of the engine 10. The highly heated compressed gas then enters the turbine section where it expands to a lower pressure and the energy released during this expansion is converted to useful work.

In the specific aviation turbine of FIG. 1, the hot compressed gas stream passes to a first turbine 18 which drives the compressor 12 and then is ducted to a propulsive nozzle 20. In other designs, the compressed gas stream may pass to a second turbine in series with the first where its remaining energy is utilized to drive the engine. In combustors used for room heating or powerhouse steam generating, the hot compressed gases are discharged from the combustor directly into the hot air or steam generator and the compressor is driven by an external power unit, e.g., by an electric motor. It will be noted that the gas turbine engine illustrated in FIG. 1 is of the radial compressor type although it is to be understood that the combustor described is equally applicable to axial compressor systems.

Referring now to FIG. 2, the combustor 14 comprises a housing 22, a combustion liner 24 mounted within the housing 22 in spaced relation thereto defining a generally toroidal-shaped combustion zone or chamber 28, and an interior housing liner 30 including annular baffle portion 26 and an annular air-fuel premixing chamber 34 disposed radially inwardly thereof having a closed upstream end 36 and opening downstream into the combustion chamber 28.

Surrounding the premixing chamber 34 and defined co-operatively by the housing 22 and the baffle 26 is a plenum 38 for receiving the pressurized air from the compressor 12. The plenum 38 communicates with the air-fuel premixing chamber 34 through a plurality of openings 40 in the baffle 26. The plenum 38 further communicates with the combustion chamber 28 through an annular orifice 42 defined by the outer circumferential surface of the downstream end of the baffle 26 and the inner surface of the upstream end of the combustion liner 24. Accordingly, pressurized air traveling from the compressor 12 into the plenum 38 is split into a main airstream entering the combustion chamber 28 through the annular orifice 42 and a secondary airstream entering the premixing chamber 34 through the baffle openings 40.

The combustion liner 24 is axially located and centered in the housing 22 by four radially extending pins 44 spaced evenly about the circumference of the housing 22 (FIG. 6) and by a radially extending ignition plug 46. The pins 44 and a plug 46 lie in a plane close to, and parallel to, a plane through the center of the combustor torus (axis y—y of FIG. 3). This method of attachment assures exact location of the combustor liner 24 in the housing 22, while permitting free heat expansion in all directions. The interior housing liner 30, including the baffle portion 26 and the annular premixing chamber 34, is radially centered on shoulders 48 in ribs 50 in the housing 22 and axially located and secured in the ribs 50 and housing 22 by axially extending bolts 52 (FIGS. 2 and 4). The housing ribs 50 coincide with the guide vanes of the radial compressor diffuser 13 and, accordingly, the bolts 52 also secure the diffuser and compressor axially and radially within the engine casing. This method of attachment also assures exact location and free heat expansion of the interior housing liner 30.

The housing ribs 50 also contain circumferentially spaced fuel passages 56 which coincide with fuel entrance bores 58 opening into the air-fuel premixing chamber 34 at the closed end 36 thereof and upstream of the baffle openings 40. A suitable O-ring 59 seals the connection between the passages 56 and the bores 58. A fuel control and metering device (not shown) external of the combustor supplies fuel to the premixing chamber at a pressure and velocity only high enough to maintain a desired fuel flow rate. A variety of suitable fuel metering devices are known in the art, and since their exact construction constitutes no part of the present invention, it is considered unnecessary to describe the fuel metering device in detail.

As previously described, the combustion liner 24 is spaced from the housing 22, thus providing a space 60 therebetween. Through this space 60 passes a small amount of pressurized air from the plenum 38 to cool the combustion liner 24 at its outer surface. In addition, if desired, the combustion liner 24 may be provided with a plurality of openings 62 therein angled generally tangentially to the inner surface thereof to provide a thin film of cooling air from the space 60 traveling tangentially to the inner surface of the combustion liner 24. A small amount of cooling air for the turbine leaves the space 60 through an annular opening 64 and the remainder passes through circumferentially spaced openings 66 (FIG. 6) into the combustor exit 68. Upstream of the baffle 26 pressurized air from the plenum 38 is circulated through a chamber 70 in the interior housing liner 30 to cool the liner 30 and the turbine. Some of the air enters the interior of the housing through a plurality of circumferentially spaced openings 72 in the liner 30 to provide a film of cooling air along the inner surface thereof. The main air entrance to the combustion chamber 28, however, is through the annular orifice 42. This orifice is sized and aerodynamically shaped to provide a main airstream having a desired velocity and a minimum pressure drop from the plenum 38 into the combustion chamber 28. The burned gases leave the combustion chamber through the exit opening 68 and are transferred to the turbine stage.

The following detailed description of the invention will make the nature of the apparatus and the combustion process occurring therein more clear, reference being had particularly to FIG. 3.

The compressed air leaving the diffuser 13 has a radial velocity component $R_o$ and a tangential velocity component $T_o$ (FIG. 4). As this air passes through the casing elbow and flows into the plenum chamber 38, the radial component $R_o$ is turned axially and is substantially slowed. The axial velocity component is now $A_1$ (FIG. 3). In spite of a small friction and turning loss, the slowing of the pressurized airstream results in a pressure rise in the plenum because of the short and smooth diffusing flow path. At the same time, the tangential velocity component is slowed as a result of a small friction loss and the vortex motion of the air. This velocity component is now $T_1$.

Figure 5:
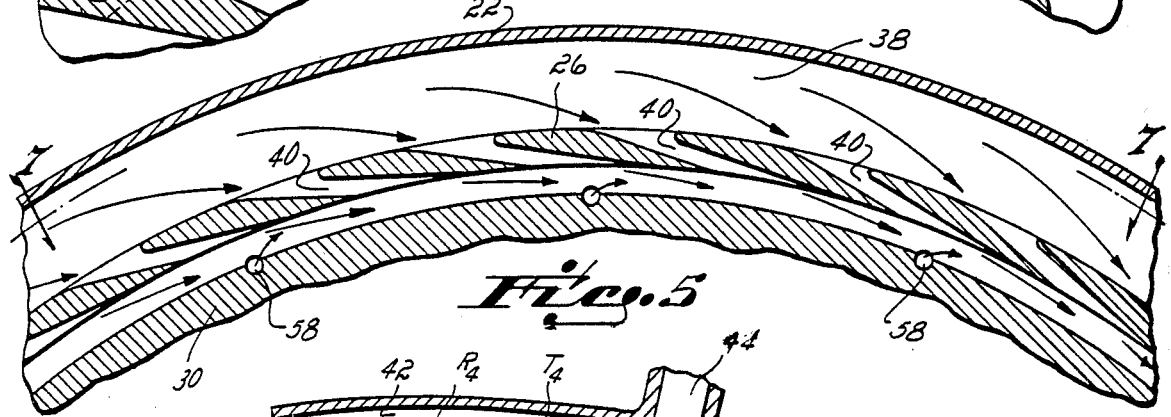
FIG. 5 is a cross-sectional view taken along line 5—5 of FIG. 2.
Figure 7:
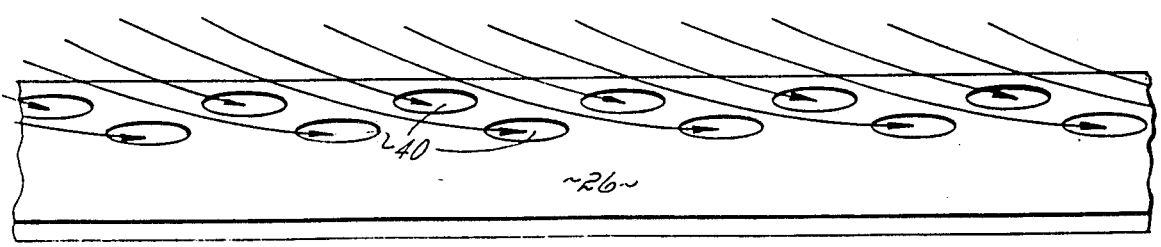
FIG. 7 is a plan view taken along line 7—7 of FIG. 5.

The pressurized airstream exits the plenum 38 through the plurality of openings 40 in the baffle 26 to provide air flow into the premixing chamber 34. Preferably, one or more rows of circumferentially spaced openings 40 are provided angled generally tangentially to the inner surface of the baffle in a direction normal to the longitudinal axis of the chamber (FIGS. 5 and 7). As a result of the tangential velocity component $T_1$ and the axial component $A_1$, the entering air forms a high velocity vortex flowing axially of the chamber. The fuel enters the premixing chamber through the bores 58 upstream of the openings 40.

As the fuel enters the premixing chamber 34, it is quickly vaporized since the chamber is in a region of high intensity radiation heating from the combustion chamber 28. Moreover, the entering fuel is hit by the inrushing high velocity air and is immediately atomized and thoroughly mixed in the violently swirling air. The combined vaporization, atomization, and entrainment of the fuel produces a substantially homogeneous vapor phase air-fuel premixture in the chamber 34. Centrifugal forces maintain the vortical flow of the premixture close to the inner baffle surface.

As shown in FIGS. 3, 5 and 7, the air flow direction into the plenum coincides with the entrance direction into the annular orifice 42 and the openings 40 in the baffle 26. As a result, the velocities are fully utilized for acceleration of the main airstream. There are no friction losses of long pathways and no turning losses. The tangential velocity component of the main airstream in the orifice 42 is now $T_2$ and the axial velocity component has been accelerated to $A_2$. The air-fuel premixture flows as a vortex axially of the engine axis 16 and is discharged into the main airstream. As the vapor stream leaves the premixing chamber, it is thrown tangentially and radially and is entrained axially circumferentially into the main airstream. The vector diagram $T_4$-$R_4$ (FIG. 6) shows the tangential and radial velocity components of the air-fuel vapor stream as it enters the main airstream. The axial and radial velocity components of the air-fuel vapor stream are very small, while the tangential component is large.

As the vector diagram $A_3$-$T_3$ shows, the axial velocity $A_2$ of the main airstream is slowed to $A_3$ when hit by the very low axial velocity air-fuel vapor stream. However, the low tangential velocity $T_2$ of the main airstream is increased to $T_3$ when the main airstream is hit by the high tangential velocity $T_4$ air-fuel vapor stream.

This energy exchange and velocity change results in a very high turbulence and mixing of the premixed air-fuel vapor stream into the main airstream at this point to generate a combustible air-fuel mixture for burning in the combustion chamber. About this point, because of the presence of an excess of oxygen and entrained high temperature burned gases, ignition occurs and combustion of the mixture begins (point P, FIG. 3).

Figure 6:
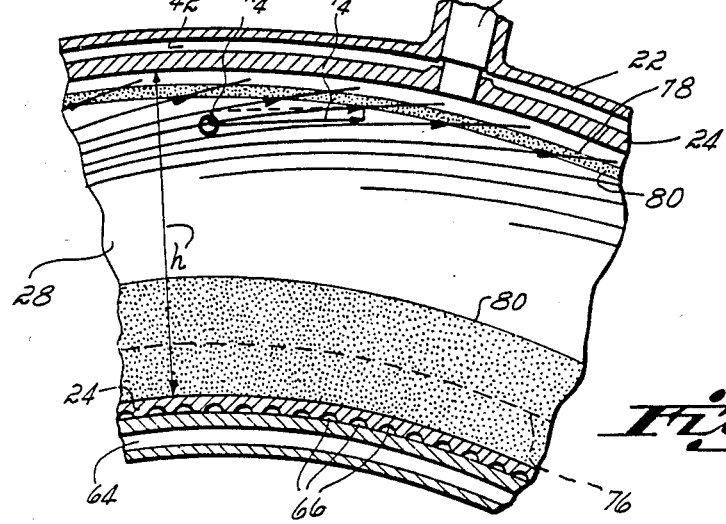
FIG. 6 is a cross-sectional view taken along line 6—6 of FIG. 3.

Since the main airstream has both a tangential and axial flow component, the resulting vector flow $V_3$ produces a toroidal-helical flow path of the burning gases in the combustion chamber as the stream moves tangentially across the surface of the toroidal-shaped combustion liner 24. Moreover, there is a vortical recirculation zone of gases in the combustion chamber. It is desirable that all the fuel in the main air-fuel stream be completely burned when the stream reaches the inner end 74 of the liner 24 at which point the liner cooling air enters the exiting gas stream from the combustion chamber through openings 66. In the embodiment shown in FIG. 3, the true burning length, or flame length, of the air-fuel stream equals the true helical-toroidal length from the ignition point P to the end 74. That is, since the gas flow path follows a toroidal-helical path, the computed true flame length is about 2.67 times h, where h is the dome height, i.e., cross-sectional diameter of the combustor liner 24 (FIG. 6). If the tangential component $T_3$ would be eliminated or turned in a negative direction, for example, by having turning vanes in front of the annular orifice 42 so that the gas flow follows a simple toroidal path rather than a toroidal-helical path, the main air-fuel stream would start out substantially axially and the burning or flame length would equal the length of the arc from the ignition point P along the inner contour of the liner 24 to end 74. The computed true length would then be about 1.8 times h, which is 48% shorter than in the case with a tangential velocity component $T_3$ in the main airstream.

In the combustion chamber are both burning and burned gases. The main air-fuel stream or burning gases flow along a combustion flow path as previously described while the burned gases, being lighter, are driven to the center of the combustion chamber. In FIG. 3, the curved dotted line 76 represents the theoretical inner border line of the main air-fuel stream. This line starts at point P and terminates normally against the inner housing liner 30 at which is called a "stagnation point" 0. The dotted line 76 is also the theoretical outer border line of the so-called recirculation zone of burned gases which exists interiorly of the dotted line. Across the border line, a very intensive mass and energy exchange and mixing process continuously occurs. That is, mass is continuously being broken away from the slower moving recirculation zone and dragged into the faster moving main air-fuel stream and is being continuously replaced in the recirculation zone by mass moving from the faster moving airstream into the slower moving recirculation zone. This phenomenon is known as "entrainment" and it begins at the beginning of the main air-fuel stream, point P, and penetrates with the downstream motion of the main air-fuel stream deeper and deeper therein until it has completely penetrated and reached the inner contour of the combustion liner 24. In FIG. 3, the solid line 78 shows the outermost limit of entrainment, i.e., how deep the entrainment penetrates at any point into the main air-fuel stream.

At the same time, the entrainment penetrates with the downstream motion of the main air-fuel stream deeper and deeper into the recirculation zone. Line 80 shows how deep this entrainment penetrates at any point into the recirculation zone. The dotted line 82 represents a theoretical border between the air-fuel premixture exiting the premixing chamber 34 and the recirculation zone. This border originates at a breakaway point 00 towards the open end of the premixing chamber and ends at the beginning of the main air-fuel stream, point P. The diverging limit lines 84 and 86 show how deep the entrainment penetrates at any point into the air-fuel premixture flow and recirculation zone.

In the diverging rolled-up space between the annular limit lines 78 and 80, and the inner contour of the combustion liner 24, the combustion of fuel in the main airstream takes place with a maximum limiting space heat release rate and with maximum flame and blowout stability. The stirring effect of the entrainment process and the roll-up of the flame around and partially into the recirculation zone combine to produce maximum heat concentration and minimum heat losses, which assure a maximum reaction rate. The heat losses are a minimum because the axial combustor length and the liner surfaces are a minimum for a given flame length and air-fuel mass flow rate. That is, the combustor length and surface are about one-half of the lengths and surfaces of classical reverse flow and straight-through flow combustors. Furthermore, the pressure drop and velocity loss from the plenum into the combustor chamber and the premixing chamber are a minimum because of low wall friction losses.

Due to the mass and energy exchange of the entrainment process and, in addition, to some wall friction and uncontrolled parasitic turbulence, the main airstream is substantially slowed through the combustion chamber, whereas the recirculation zone is accelerated and kept in fast axial and tangential vortical motion. This recirculation zone is filled with completely burned gases of high temperature. Because these gases are the lightest, they are continuously pushed toward the center of the combustion chamber into the recirculation zone. As shown in FIG. 3, the axial velocity component $A_3$ at the beginning of the main air-fuel stream is approximately twice that of the axial velocity component $A_5$ at the liner end 74. Dotted line 88 delineates on the y—y axis the approximate axial vortex velocity components of the recirculation zone and main air-fuel stream. As may be seen, the axial velocity component is zero at the aerodynamic center of the combustion chamber torus, where line 88 intersects the y—y axis. The flow lines and arrows in FIG. 3 illustrate the recirculating vortex flow interiorly of line 76 and the flow of the gas stream exteriorly of line 76 leaving the combustor through the exit 68 to the turbine stage.

The combustor comprising this invention is characterized by efficient burning with minimum formation of unburned hydrocarbons and oxides of nitrogen. This highly efficient burning action with a minimum of unburned hydrocarbons is achieved because the substantially homogeneous vapor phase air-fuel mixture is burned in a combustion chamber having a maximum possible wall temperature and minimum surface area per pound of fuel-air mass flow rate. Specifically, the combustion liner 24 of my invention is of small surface area, double-curved and of one piece. It is stiff and durable and can be made of advanced high temperature resistant materials, thereby requiring a minimum of cooling while remaining operational at elevated temperatures. The cooling required can be simple convection cooling from the outside of the liner and, if desired, internal film cooling through openings 62 in the liner wall tangentially to the inner contour of the liner. Accordingly, burning does not take place on these surfaces, thereby rendering the heat load thereon.

The combustor heretofore described is also effective in minimizing nitric oxide emissions because combustion occurs primarily with a lean air-fuel mixture having an equivalence ratio, defined as the actual fuel-to-air ratio divided by the stoichiometric fuel-to-air ratio, below about 0.6 and at a combustion temperature mostly below about 2850° F. The stirring effect of the controlled turbulence and the maximum heat concentration resulting from the rolled-up flame assure the necessary high reaction rate for flame and blow-out stability. The large amount of excess oxygen also prevents carbon monoxide emissions.

A further advantage of my invention is its simplicity of construction and ease of maintenance. Referring to FIG. 2, the combustor may be opened by removing a series of circumferentially spaced bolts 90, thereby allowing removal of the downstream housing portion. Next, by withdrawing the four radial pins 44 and the ignition plug 46, the combustor liner 24 may be removed. Finally, by removing the bolts 52, the interior housing liner 30 may be removed. Accordingly, easy access is available to those parts exposed to the highest heat load whereby they may be easily removed and repaired or replaced as needed.

Referring now to FIGS. 8, 9, 10 and 11, there is shown another embodiment of my invention. More particularly, there is shown an interior housing liner 96 wherein the baffle portion 26 comprises a stationary member 92 and a sleeve member 94 movable circumferentially and axially relative thereto. Further, the interior housing liner 96 includes a second baffle 98 extending downstream and disposed radially inwardly of the baffle portion 26 defining therewith the annular premixing chamber 34 and the downstream open end 99 of the premixing chamber 34 and into the combustion chamber 28.

Figure 9:
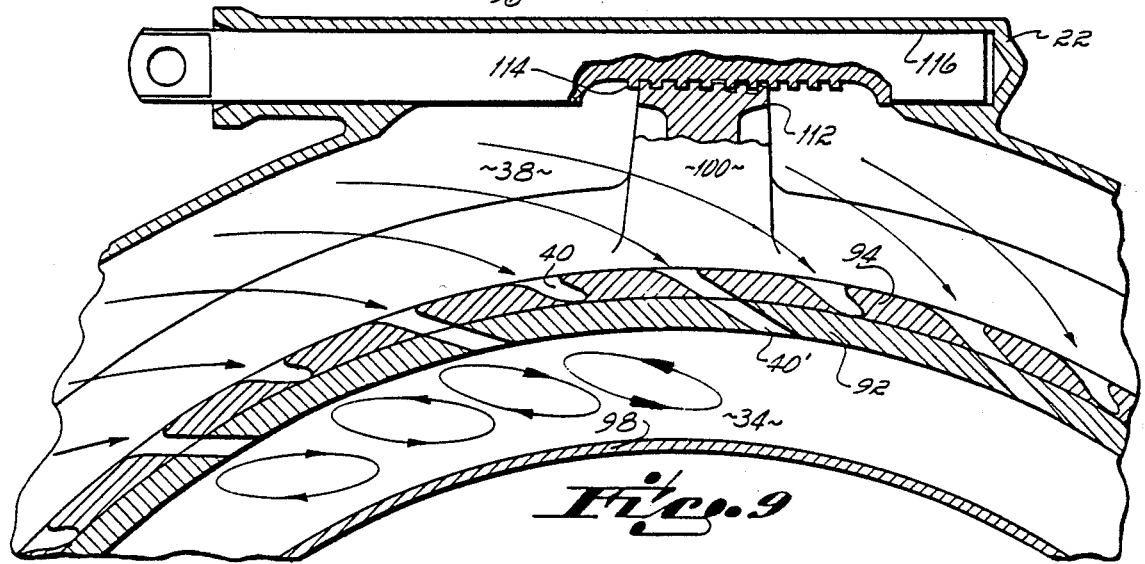
FIG. 9 is a cross-sectional view taken along line 9—9 of FIG. 8 showing the openings in a full open position.

The sleeve member 94 is U-shaped with an upstream extension 100 and a downstream extension 102. The sleeve member 94 is circumferentially and axially movable on the stationary member 92 and is axially positionable by the female square threads 104 in the sleeve upstream end 100 which engage male square threads 106 on the upstream end of the stationary member 92. When at design air-fuel mass flow rate through the combustor, the face 108 of the sleeve 94 touches the face 110 of the stationary member 92 and the radially outermost edge of the baffle downstream extension 102 is spaced from the combustion liner 24 so that the annular main air entrance orifice 42 is defined. Simultaneously, the openings 40 into the premixing chamber 34 are in full, open position, i.e., the openings 40 in the sleeve member 94 and those 40' in the stationary member 92 coincide (FIG. 9).

Figure 10:
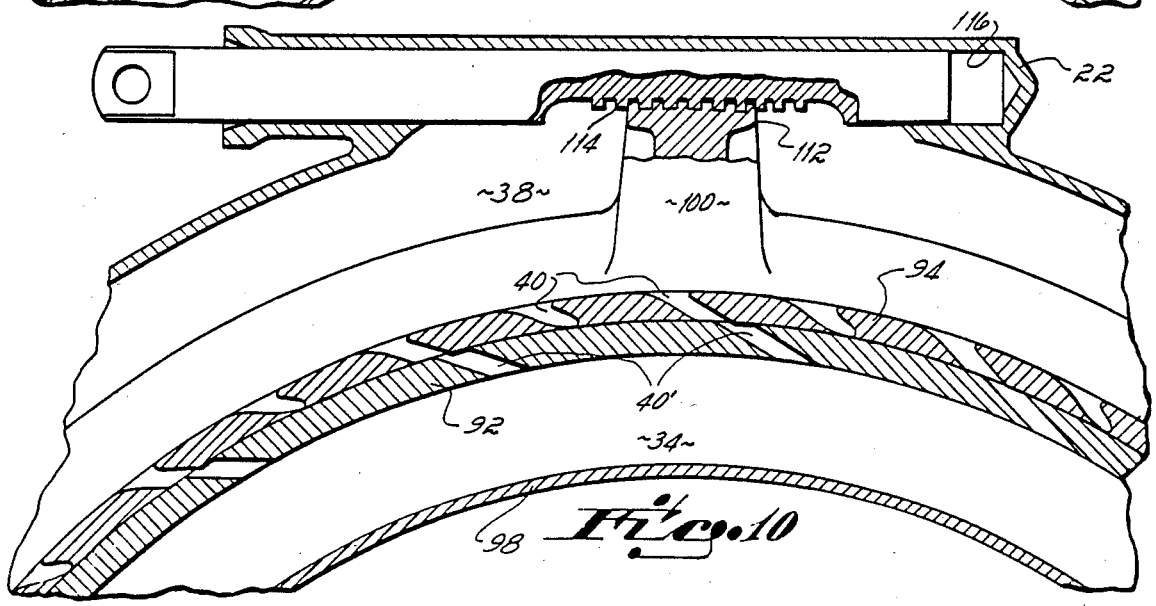
FIG. 10 is a cross-sectional view similar to FIG. 9 showing the openings in a partially closed position.

Integrally with the extension 100 of the sleeve member 94 is a spoke and spur gear segment 112 which engages a circular tooth rack 114 embedded in a suitable annular bore 116 in the housing 22. Accordingly, with reference to FIGS. 9 and 10, if the tooth rack 114 is pulled to the left, the sleeve member 94 moves circumferentially to the left and the openings into the premixing chamber 34 become partially closed by the circumferential offset of openings 40 with respect to 40', as shown in FIG. 10. Further movement toward the left will further and completely close or offset the openings 40 with respect to 40'. Simultaneously with this circumferential motion to the left, the sleeve member 94 moves axially to the right, or downstream, because the axial position of the sleeve member 94 is controlled by the axial downstream lead of the engaged female and male threads 104 and 106, respectively. Because of this axial motion to the right of the sleeve member 94, the main air orifice 42 between the radially outermost edge of the downstream baffle extension 102 and the combustion liner 24 is enlarged. This enlargement corresponds to the passage area reduction into the air-fuel premixing chamber and assures constant air flow and pressure in the plenum independent of varying air flow into the air-fuel premixing chamber. This is necessary for stable operation of a highly loaded air compressor.

Should for any reason it be required to keep the air entrance passage into the combustor constant or have it reduced, this can be accomplished by replacing the thread system with a downstream lead by a simple circumferentially interrupted tongue and groove system or, respectively, by a thread system with an upstream lead. Further, if the pressure in the plenum chamber must remain constant, this is accomplished, as shown in FIG. 11, by bleeding the excess air from the plenum 38 as cooling air directly through a passage 118 located upstream of the plenum 38 and the premixing chamber 34 into the combustor exit 68. When the sleeve member 94 is circumferentially in the full open position for the air passages into the air-fuel premixing chamber, the upstream extension 100 of the sleeve 94 keeps the passage 118 closed, or almost closed, and no air, or only a desired amount, can escape from the plenum 38 into the combustor exit 68. When the sleeve is circumferentially partly or completely in the closed position, the upstream extension of the sleeve keeps the passage correspondingly partly or completely open and the excess air can escape from the plenum directly into the combustor exit.

If for any reason it is desired to control the bypass air flow independent of the main air flow and the air flow into the air-fuel premixing chamber, this can be accomplished by separating the upstream extension 100 of the sleeve member 94 and controlling them by separate gear and rack and segment systems.

Figure 8:
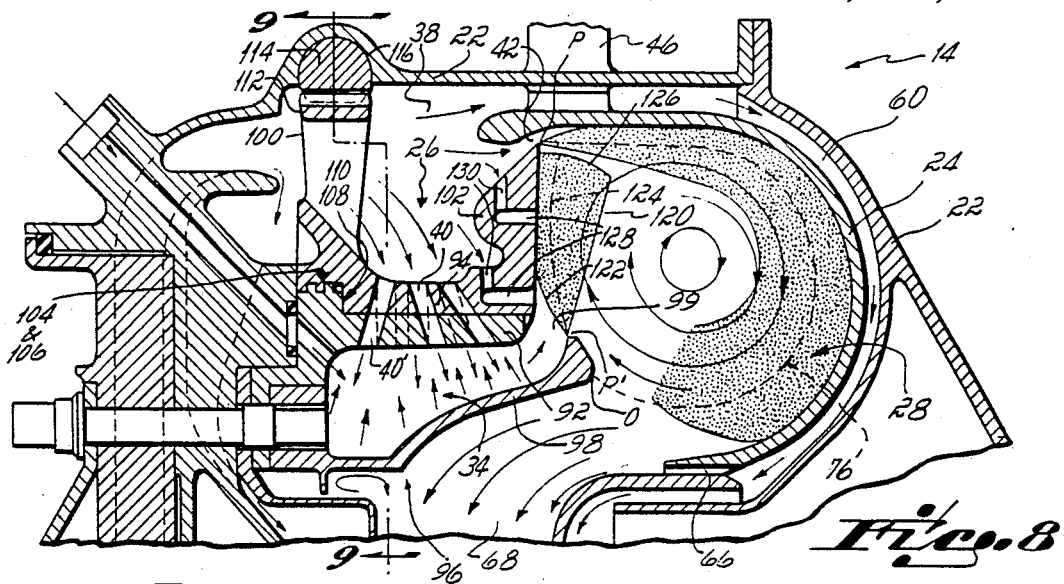
FIG. 8 is a cross-sectional view similar to FIG. 2 showing another embodiment of the combustor.

As shown in FIGS. 8 and 9, the air entrance openings 40 and 40' into the air-fuel premixing chamber 34 are axially and tangentially arranged and evenly spaced from each other so that the individual air jets cannot collide, but rather impinge the baffle 98 of the chamber 34 in a pattern evenly spread over the entire hot surface thereof. This allows the individual jet to develop its own air-fuel entrainment and recirculation zone. The arrows in FIG. 9 indicate this recirculation. When the air jets hit the hot baffle surface, they are drenched with fuel and the heat transfer to the air-fuel mixture and, consequently, the cooling of the baffle 98 is a maximum. As a result of this controlled heat transfer and stirred turbulence, a substantially homogeneous vapor phase air-fuel stream leaves the premixing chamber through its annular exit opening 99 into the combustion chamber 28.

In the combustor shown in FIG. 8, combustion occurs in two stages. In the first stage, combustion occurs on the fuel-rich side with no nitric oxide emissions and, in the second stage, on the fuel-lean side, again with no nitric oxide emissions. As a result of the variable air passages into the air-fuel premixing chamber and the simultaneously varying annular orifice into the combustion chamber, a constant, or any desired, air-fuel ratio in both stages of combustion can be achieved for any desired fuel flow rate.

The first stage of combustion occurs in the air-fuel premixture stream discharged from the premixing chamber 34 in the diverging space between the annular outer entrainment limit line 120 and the annular inner entrainment line 122 and the downstream face of the baffle extension 102. The dotted line 124 represents, as in FIG. 3, the theoretical border line between the air-fuel premixture stream and the recirculation zone.

For a given design fuel flow rate, the air inlet passages into the air-fuel premixing chamber can be sized so that the air-fuel premixture equivalence ratio is about 1.35, which is fuel-rich, but well within the stable burning limit of a vapor phase air-fuel mixture. The maximum combustion temperature at this air-fuel ratio is about 3400° F.; however, there is little or no nitric oxide emission because the available oxygen reacts more readily with the hydrogen and carbon than with the nitrogen. Furthermore, the combustion reaction rate is a maximum due to the entrainment of high temperature burned gases from the recirculation zone and the radiation heat of the closely spaced rolled-up flame of the second stage of combustion.

The air-fuel premixture stream leaves the opening 99 with a large tangential velocity component and thus travels the desired, relatively long gas flow path length before entering the main airstream. By the time the burning particles approach the main airstream, the combustion in the first stage is completed (line 126, FIG. 8). The computed true flow path length of a burning particle from the ignition point P' to the line 126 is equal to about 1.5 times h, where h is again the dome height of the combustor.

Any unburned fuel from the first combustion stage now mixes with the main airstream entering through the annular orifice 42 and the second stage of combustion begins about at point P. The fuel-air equivalence ratio is now about 0.6 or lower with a combustion temperature of about 2800° F. Despite the leanness of the fuel-air mixture, the combustion reaction rate is high due to the entrainment of the high temperature burned gases, the radiation heat of the closely spaced high temperature flame of the first combustion stage and minimum heat losses from the combustor liner.

As shown in FIG. 8, the first stage combustion flame with a temperature of about 3400° F. burns very close to the downstream face of the sleeve member extension 102, but not in contact therewith. Rather, an air film which is formed by air flowing through, and spilling out of, a series of spaced grooves 128, which are continuously replenished by air from the plenum 38 through passages 130 communicating therewith, flows between the face and the flame, thereby drastically decreasing heat flow to the extension 102. The flame side of this air will burn, but not its boundary layer flowing along the face. The heat entering the extension is rejected by convection partly from the upstream face of the baffle extension into the fast-moving cooler air in the plenum, and partly from the inner surfaces of the grooves 128 into the fast-moving cooler air in the grooves. Since the air in the plenum chamber maintains a high tangential velocity $T_1$, as described earlier, and continuously strikes the entire upstream face of the extension with this velocity, the heat transfer from the baffle extension to the cooler air is excellent, as is the cooling of the baffle. The air from the plenum chamber approaches the tangential entrance passages 130 into the groove 128 with the full velocity $T_1$ and in the passages 130 gets accelerated to a high tangential velocity as a result of the pressure drop from the plenum into the combustion chamber. The area of the tangential entrance passages 130 into the grooves 128 is a small fraction of the axial passage area of the grooves 128. Therefore, the axial velocity in the grooves 128 is very small and the air motion is completely controlled by the centrifugal field of the tangential velocity component. Therefore, the air moves on the inside of the grooves with a high tangential velocity along the radially outer surface of the grooves until it reaches their downstream end where it turns smoothly into the faces and crosses them tangentially being wedged between the face and the flame. By properly choosing the number of grooves and the axial and radial depth for a given cooling air mass flow rate and flame temperature, the metal temperature of the baffle can be closely controlled over a wide range of operating conditions. Further, since a static load on the baffle is small and since it may be made of advanced high temperature resisting materials, the allowable metal temperature of the baffle can be high and the required cooling air mass flow rate low.

However, should it be desired to reduce the heat load on the baffle, this may be accomplished as shown in FIG. 12 by forming the first stage combustion a suitable distance downstream of the baffle. In this embodiment, it is preferable that the exit opening 131 from the air-fuel premixing chamber 34 be in the form of individual circumferentially spaced openings rather than a continuous annular orifice as heretofore described. This results in individual air-fuel streams which generate individual entrainment patterns about themselves. They are spaced far enough apart to leave between them passageways so that burned high temperature gases from the downstream recirculation zone in the combustion chamber can easily pass between them to the upstream side thereof and fulfill the entrainment requirement about them. As a result, the reaction rates in these individual air-fuel streams are a maximum and the combustion time of the available oxygen and the flame lengths are a minimum.

However, it is possible to maintain an annular flame spaced downstream from the baffle. This flame will be stable if the cooling air flow through the baffle and into the upstream side of the flame is increased. The entrainment of the cooling air flow along the baffle will produce an upstream recirculation zone, as shown by the arrows in FIG. 12.

FIG. 12 illustrates a baffle that allows for the control of cooling air flow simultaneously with the air flow into the premixing chamber 34. In the baffle, a radially innermost cooling air groove 132 is located immediately beneath and in the face of the baffle member 92 and is connected to the plenum 38 by tangentially arranged passages 134 in the sleeve member 94 and coinciding passages 134' in the baffle member 92. In addition, the passages 134, 134' are arranged relative to the passage 40, 40' from the plenum chamber 38 into the air-fuel premixing chamber 34 such that when the passages 40, 40' are in a desired open position, e.g., fully open, the passages 134, 134' are in a correspondingly fully open position. This allows for the control of cooling air into the entrainment space between the baffle and the flame as a function of fuel flow.

FIG. 13 shows a longitudinal section of another embodiment of my invention that allows for the control of the main airstream from the plenum into the combustion chamber, the flow of the cooling air around the combustion liner, and the flow of excess air from the plenum into the combustor exit all simultaneously with the control of air flow into the air-fuel premixing chamber. FIG. 13 is similar to the combustor shown in FIGS. 8 and 12; however, in the combustor shown in FIG. 13, an additional liner 140 has been interposed between the housing 22 and the combustor liner 24, thus defining a cooling air space 142 between the liner 24 and the liner 140 and a corresponding bypass air space 144 between the liner 140 and the housing 22. The air spaces 142 and 144 communicate with the plenum 38 through a plurality of circumferentially spaced openings 146 and 148, respectively. Likewise, the main airstream from the plenum 38 to the combustion chamber 28 enters through a plurality of circumferentially spaced orifices 150. In addition, the downstream extension 102 of the baffle sleeve member 94 carries a plurality of radially-extending fingers 152 operative to close off the openings 146 and 148 and the orifices 150.

The main air entrance orifices 150, the openings 146 and 148 to the air spaces 142 and 144, respectively, and the fingers 152 are sized and spaced such that at the full air flow through the opening 40, 40' into the air-fuel premixing chamber 34 there is full air flow to the combustion chamber 28, the cooling air space 142 and to the entrainment space between the first stage flame and the downstream face of the baffle extension 102 through the openings 128 and 134, 134', with little or no air flow through the bypass space 144 (FIG. 13). If the fuel flow into the premixing chamber 34 is reduced, then the sleeve 94 is rotated by the gear rack 114 and the mating gear segment 112, as earlier described, partly closing off the openings 40, 40' into the premixing chamber 34 and the openings 134, 134' from the plenum into the entrainment space adjacent the first stage flame to provide the desired air-fuel ratio for the first stage of combustion. Simultaneously, the orifices 150 are partially closed off by the fingers 152 to reduce the main air flow to the combustion chamber to provide the desired air-fuel ratio for the second stage of combustion with the reduced fuel flow. In addition, the openings 146 are either partially or completely closed off to reduce the flow of cooling air behind the liner 24 and thereby reduce heat losses from the lean second stage of combustion. This prevents early blowout of the second stage combustion, especially at altitudes where the ambient pressure and temperature are low. Still further, the openings 148 to space 144 are open to bleed the excess plenum air behind liner 140 to the combustor exit 68 to maintain the desired pressure in the plenum 38.

The embodiments of my invention shown in FIGS. 15 and 16 provide for a relatively long first stage flame as may be desired, for example, for slow burning fuels. Referring first to FIG. 16, it may be seen that the combustion liner 24 is so shaped and placed with respect to the housing 22 that the air-fuel premixture exiting the premixing chamber 34 achieves the desired long flow path length before colliding and mixing with the main airstream entering the combustion chamber through opening 160. The dotted line 162 represents the theoretical borderline between the premixture stream and the main airstream while the lines 164 and 166 are the theoretical entrainment and mixing limit lines.

In spite of the lean air-fuel ratio in the second stage of combustion, the combustion reaction rate is high due to the presence of high temperature burned gases and the radiation heat of the closely spaced first stage of combustion. Further, the downstream end of the liner 24 and the housing 22 produce a recirculation zone. A dotted line 168 which starts at the annular breakaway edge 170 and ends at the stagnation point O is the theoretical borderline between the main air-fuel stream and the recirculation zone. The lines 172 and 174 are the theoretical entrainment and mixing limit lines. Since the recirculation zone is filled with burned high temperature gases, a second annular ignition and flame anchoring zone of the second stage of combustion is generated beginning at the breakaway edge 170. The same results can be achieved in the embodiments of my invention described in relation to FIGS. 3, 8 and 12 by shaping the combustor liner 24, such that an annular, downstream extending space is provided for a second recirculation zone before the gas stream enters the exit 68.

The embodiment shown in FIG. 15 differs from that shown in FIG. 16 in that the combustion liner 24 is provided with a plurality of generally axially extending passages 178 of suitable size, number and arrangement, as shown in FIG. 17, to allow the main airstream to enter the combustion chamber in the form of individual jets with which the air-fuel premixture collides and mixes. The outer and inner limit lines of entrainment and mixing of the air jets are shown at 180 and 182, respectively. Because of the concentric arrangement of the passages 178 and the attendant entrainment pattern, a recirculation zone of completely burned high temperature gases is produced which together with the entrained high temperature gases and the radiation heat from the closely spaced first combustion stage ignites and anchors the lean second stage combustion flame about at the breakaway edges 184 of the main air entrance passages 178 in the liner 24.

Accordingly, it may be seen that the embodiments shown in FIGS. 15 and 16 in comparison with that shown in FIG. 13 moves the breakaway edge, point P, downstream to delay the collision and mixing the air-fuel premixture with the main airstream for a desired time or for a desired gas flow path length. Then film cooling of the inner contour of the combustion liner is provided through the openings 186. Further, air flow control is accomplished by the movement of the radial fingers 152 in the manner described in relation to FIG. 13. The bypass air through passageway 118 is controlled in the manner described in relation to FIG. 11.

FIG. 18 shows schematically an application of my invention to an annular straight flow combustion chamber integrated between an axial compressor 200 and an axial turbine 202 about the longitudinal axis 204 of a large gas turbine engine. It may be seen that the combustor comprises a housing 206, a combustion liner 208 mounted within the housing 206 in spaced relation thereto defining a combustion chamber 210, and an interior radial strut system 212 supporting three concentrically disposed annular air-fuel premixing chambers 214, each having a closed upstream end 216 and an opening downstream into the combustion chamber 210. Surrounding the premixing chambers 214 is a plenum 218 for receiving pressurized air from the compressor 200. The plenum communicates with the air-fuel premixing chambers 214 through a plurality of openings 220 in the radially inner and outer baffle portions 222 and 224, respectively, of each chamber 214. The plenum 218 further communicates with the combustion chamber 210 through three concentric annular orifices 226 defined by the outer circumferential surfaces of the downstream ends of the outer baffle portions 224 and the inner circumferential surfaces of either the adjacent combustor liner 208 or inner baffles 222. Fuel is injected into the premixing chambers 214 through the fuel entrance bores 228 at the closed upstream ends 216 of the air-fuel premixing chambers 214.

Pressurized air from the compressor 200 enters the plenum 218 and passes into the air-fuel premixing chamber 214 through the openings 220 in the baffle portions 222 and 224, the openings 220 being angled generally tangentially to the inner surfaces thereof. The entering pressurized airstreams create high velocity vortices flowing axially of the premixing chambers 214 which atomize and entrain the fuel injected at the upstream ends 216 thereof to produce substantially homogeneous vapor phase air-fuel premixtures. The premixtures then exit the premixing chambers through the concentric annular orifices 230 and begin burning. The mixtures are fuel-rich but well in the stable burning limit because of the presence of the high temperature entrained gases. Pressurized air from the plenum 218 also enters the combustion chamber through the concentric annular orifices 226 to provide the corresponding main airstream for each air-fuel premixture stream. As heretofore disclosed and described, the unburned air and fuel from the air-fuel premixture stream enters the main airstream with a high tangential velocity component and is circumferentially and axially entrained therein. Due to the radially close spacing of the burning air-fuel streams and the recirculation zones with their respective stagnation points O, the air-fuel streams burn as fast and stable and contamination-free as in the embodiments previously disclosed. The radial spacing between the air-fuel premixture chambers and main air orifices into the combustor are chosen such that the true burning lengths of the three air-fuel premixture streams before entering the main airstreams are about equal. This choice of radial spacing also allows for a given pressure drop into the combustor and equal axial stream velocities and mass flow rates for the three streams.

The arrangement of the air-fuel premixture chambers in the combustor shown in FIG. 18 has the advantage that the air entrance openings 220 can be arranged in the tops and bottoms of the premixture chambers. Furthermore, in such a multiple premixture chamber arrangement, there is no need for mechanical devices to reduce the air mass flow to the premixture chamber and the main airstream flow to maintain a constant air-fuel ratio with reduced fuel flow and engine output. Rather, this is achieved by simply cutting out the fuel flow to one or more of the premixture chambers. For example, fuel flow may be cut first to the radially inner chamber to reduce engine output and then to the radially outer chambers for further reduction or to idle the engine. This can be done because the air-fuel streams of the various chambers and main airstreams are separated from each other by the recirculation zones.

Thus having described the invention, what is claimed is:

1. A combustor for generating a hot gas stream by the combustion of fuel in a pressurized airstream, said combustor comprising:
   a housing;
   an arcuate combustor liner mounted within said housing in spaced relation thereto effective to constrain the gas flow to form a generally toroidal-shaped combustion zone;
   an annular air-fuel premixing chamber defined by a first annular baffle and a second annular baffle disposed radially inwardly thereof, said chamber having an upstream end and opening downstream into said combustion zone through an opening defined by said baffles;
   said first baffle comprising a stationary member and a sleeve member movable relative to said stationary member, each of said members having a plurality of spaced openings therein angled generally tangentially to the inner surface thereof, said sleeve member being movable between a full open position wherein said openings are aligned, a closed position wherein said openings are offset and a plurality of partially open positions therebetween, thereby controlling the flow of air therethrough;
   means for injecting fuel into said premixing chamber;
   means integral with said sleeve member for moving said sleeve member relative to said stationary member;
   a compressed air inlet plenum surrounding said premixing chamber and separated therefrom by said first baffle, said plenum communicating with said premixing chamber through said openings to provide for the entry of air to generate a vortical flow of a substantially homogeneous vapor phase air-fuel premixture axially of said premixing chamber;
   said plenum further communicating with said combustion zone through an orifice outwardly circumferential of said sleeve member at the downstream end thereof and defined by said sleeve member and said liner providing for the entry of a main airstream into said combustion zone adjacent to the outer periphery thereof;
   the vortical discharge from said premixing chamber entering said main airstream generally tangentially thereto and being mixed therein to generate a combustible air-fuel mixture for burning in said combustion zone.

2. The combustor of claim 1 wherein said main airstream has a vector component of flow effective to generate a helical gas flow path through the toroidal-shaped combustion zone such that said combustible mixture burns in the form of a segment of a toroid surrounding and partially into a vortical recirculation zone of burned gases.

3. The combustor of claim 1 wherein said first baffle includes a passage providing for the flow of air from said plenum to said combustion zone upstream of the burning premixture.

4. The combustor of claim 3 wherein said first baffle includes means for controlling the flow of air through an annular orifice, through the space between said liner and said housing and through said passage simultaneous with the flow of air to said premixture chamber.

5. A combustor for generating a hot gas stream by the combustion of fuel in a pressurized airstream, said combustor comprising:
   a housing;
   an arcuate combustor liner mounted within said housing in spaced relation thereto effective to constrain the gas flow to form a generally toroidal-shaped first combustion zone;
   an air-fuel premixing chamber having an upstream end and opening downstream into said first combustion zone;
   means for injecting fuel into said premixing chamber at said upstream end; and
   a compressed air inlet plenum surrounding said premixing chamber and separated therefrom by a baffle, said plenum communicating with said premixing chamber through a plurality of openings in said baffle providing for the entry of air to generate a substantially homogeneous vapor phase air-fuel premixture in said premixing chamber for burning in said first combustion zone;
   said plenum further communicating with the space between said liner and said housing providing for the flow of a main airstream into a second combustion zone radially inwardly of said premixing chamber;
   said premixture entering said main airstream after burning in said first combustion zone and being mixed therein to generate a combustible air-fuel mixture for burning in said second combustion zone.

6. The combustor of claim 5 wherein said openings in said baffle are angled generally tangentially to the inner surface thereof to generate a vortical flow of said air-fuel premixture axially of said premixing chamber, the vortical discharge from said premixing chamber having a vector component of flow effective to generate a helical gas flow path through the toroidal-shaped first combustion zone such that said premixture burns in the form of a segment of a toroid surrounding and partially into a vortical recirculation zone of burned gases.

7. The combustor of claim 5 wherein said combustible air-fuel mixture has a vector component of flow effective to generate a second vortical recirculation zone of burned gases in said second combustion zone.

8. The combustor of claim 5 wherein the main airstream flows from the space between said liner and said housing and into said second combustion zone through a plurality of generally axially extending, circumferentially spaced openings in said liner.

9. A combustor for generating a hot gas stream by the combustion of fuel in a pressurized airstream, said combustor comprising:
   a housing;
   an arcuate combustor liner mounted within said housing in spaced relation thereto effective to constrain the gas flow to form a generally toroidal-shaped first combustion zone;
   an annular air-fuel premixing chamber defined by a first annular baffle and a second annular baffle disposed radially inwardly thereof, said chamber having a closed upstream end and opening downstream into said first combustion zone through an opening defined by said baffles;
   said first baffle comprising a stationary member and a sleeve member movable relative to said stationary member, each of said members having a plurality of spaced openings therein angled generally tangentially to the inner surface thereof, said sleeve member being movable between a full open position wherein said openings are aligned, a closed position wherein said openings are offset and a plurality of partially open positions therebetween, thereby controlling the flow of air therethrough;
   means for injecting fuel into said premixing chamber;
   means integral with said sleeve member for moving said sleeve member relative to said stationary member; and
   a compressed air inlet plenum surrounding said premixing chamber and separated therefrom by said first baffle, said plenum communicating with said premixing chamber through said openings to provide for the entry of air to generate a substantially homogeneous vapor phase air-fuel premixture in said premixing chamber for burning in said first combustion zone;
   said plenum further communicating with the space between said liner and said housing providing for the flow of a main airstream into a second combustion zone radially inwardly of said premixing chamber;
   the vortical discharge from said premixing chamber entering said main airstream after burning in said first combustion zone and being mixed therein to generate a combustible air-fuel mixture for burning in said second combustion zone.

10. The combustor of claim 9 wherein said movable baffle member includes a passage providing for the flow of air from said plenum to said first combustion zone upstream of the burning premixture.

11. The combustor of claim 10 wherein said movable baffle member further includes means for controlling the flow of the main airstream and the flow of air through said passage simultaneous with the flow of air to said premixture chamber.

12. A combustor for generating a hot gas stream by the combustion of fuel in a pressurized airstream, said combustor comprising:
   a housing;
   a combustion zone therein;
   an air-fuel premixing chamber having an upstream end and opening downstream into said combustion zone;
   means for injecting fuel into said premixing chamber; and
   a compressed air inlet plenum surrounding said premixing chamber and separated therefrom by a baffle, said plenum communicating with said premixing chamber through a plurality of openings in said baffle providing for the entry of air to generate a substantially homogeneous vapor phase air-fuel premixture in said premixing chamber;
   said plenum further communicating with said combustion zone through an orifice outwardly circumferential of said baffle and at the downstream end thereof providing for the entry of a main airstream into said combustion zone adjacent to the outer periphery thereof; and
   means for controlling the flow of air from said inlet plenum to said premixing chamber and to said combustion zone;
   said premixture entering said main airstream and being mixed therein to generate a combustible air-fuel mixture for burning in said combustion zone.

13. A combustor for generating a hot gas stream by the combustion of a pressurized premixed air-fuel stream, said combustor comprising:
   a housing;
   an arcuate combustor liner and baffle mounted within said housing defining a combustion chamber;
   an air-fuel premixing chamber having an upstream end and a downstream orifice opening into said combustion chamber;
   means for injecting fuel into said premixing chamber; and
   a compressed air inlet plenum chamber formed by said housing and said baffle;
   means interconnecting said plenum with said premixing chamber, whereby pressurized air flows from said plenum into said premixing chamber to form a substantially homogeneous vapor-phase air-fuel premixture in said premixing chamber;
   said plenum further communicating with said combustion chamber through an orifice outwardly circumferential of said baffle and at the downstream end thereof and defined by said baffle and said liner providing for the entry of a main airstream from said plenum into said combustion chamber adjacent to the outer periphery thereof;
   said baffle including means for controlling said flow of pressurized air from said plenum into said premixing chamber simultaneous with the flow of said main air into said combustion chamber;
   said downstream orifice of said premixing chamber being spaced from said air inlet orifice, whereby the discharge of said premixing chamber is introduced into said main airstream adjacent to said air inlet orifice.

14. A combustor for generating a hot gas stream by the combustion of a pressurized premixed air-fuel stream, said combustor comprising:
   a housing;

an arcuate combustor liner and baffle mounted within said housing and defining a generally toroidal-shaped combustion chamber;

an air-fuel premixing chamber having an upstream end and a downstream orifice opening into said combustion chamber;

means for injecting fuel into said premixing chamber;

a compressed air inlet plenum chamber formed by said housing and said baffle;

means interconnecting said plenum with said premixing chamber, whereby pressurized air flows from said plenum into said premixing chamber to form a substantially homogeneous vapor-phase air-fuel mixture in said premixing chamber;

an orifice outwardly circumferential of said baffle and at the downstream end thereof and defined by said baffle and said liner providing for the entry of a main airstream from said plenum into said combustion chamber adjacent to the outer periphery thereof;

said baffle including means for controlling said flow of pressurized air into said premixing chamber simultaneous with the flow of said main air into said combustion chamber;

the downstream orifice of said premixing chamber being spaced from said air inlet orifice, whereby the discharge of said premixing chamber is introduced into said main airstream adjacent to said air inlet orifice;

said housing having a circumferential exit formed therein spaced downstream of said liner, presenting a concave surface disposed transversely of the flow of gases in said combustion chamber, whereby the gases in said combustion chamber are forced by the liner to flow in a generally toroidal path from said premixing chamber and said air inlet to said exit.

15. A combustor of claim 14 wherein said baffle includes means for controlling excessive air flowing from said plenum into the exit passage of said combustion chamber.

16. A combustor for generating a hot gas stream by the combustion of a pressurized premixed air-fuel stream, said combustor comprising:

a housing;

an arcuate combustor liner and baffle mounted within said housing defining a combustion chamber;

an air-fuel premixing chamber having an upstream end and a downstream orifice opening into said combustion chamber;

means for injecting fuel into said premixing chamber; and a compressed air inlet plenum chamber formed by said housing and said baffle;

means interconnecting said plenum with said premixing chamber, whereby pressurized air flows from said plenum into said premixing chamber to form a substantially homogeneous vapor-phase air-fuel premixture in said premixing chamber;

said baffle comprising a stationary member and a sleeve member movable relative to said stationary member, each of said members having a plurality of spaced openings therein angled generally tangentially to the inner surface thereof, said sleeve member being movable between a full open position wherein said openings are aligned, a closed position wherein said openings are offset and a plurality of partially open positions therebetween, thereby controlling the flow of air therethrough;

means integral with said sleeve member for moving said sleeve member relative to said stationary member; and said plenum communicating with said premixing chamber through said openings to provide for the entry of air to generate a vortical flow of said substantially homogeneous vapor-phase air-fuel mixture axially of said premixing chamber;

said plenum further communicating with said combustion chamber through an orifice outwardly circumferential of said sleeve member and at the downstream end thereof and defined by said sleeve member and said liner providing for the entry of a main airstream from said plenum into said combustion chamber adjacent to the outer periphery thereof;

said movable sleeve extension including means for controlling said main airstream flow into said combustion chamber simultaneous with said flow of air into said premixing chamber;

said downstream orifice of said premixing chamber being spaced from said main air inlet orifice, whereby the vortical discharge from said premixing chamber is introduced generally tangentially into said main airstream adjacent to said air inlet orifice.

17. A combustor for generating a hot gas stream by the combustion of a pressurized premixed air-fuel stream, said combustor comprising:

a housing;

an arcuate combustor liner mounted within said housing in spaced relation thereto and defining a combustion zone;

an air-fuel premixing chamber having an upstream end and opening downstream into said combustion zone;

means for injecting fuel into said premixing chamber;

a compressed air inlet plenum surrounding said premixing chamber and separated therefrom by a baffle, said plenum communicating with said premixing chamber through means in said baffle providing for the entry of air to generate a substantially homogeneous vapor phase air-fuel premixture in said premixing chamber for burning in said combustion zone, said means in said baffle being effective to variably control the flow of air to said premixing chamber;

said plenum further communicating with the space between said liner and said housing providing for the flow of a main air stream into a second zone radially inwardly of said premixing chamber;

the discharge from said premixing chamber after burning in said combustion zone entering said main air stream and being mixed therein said second zone.

18. A combustor for generating a hot gas stream by the combustion of a pressurized premixed air-fuel stream, said combustor comprising:

a housing;

an arcuate combustor liner mounted within said housing in spaced relation thereto and defining a combustion zone;

an air-fuel premixing chamber defined by a first annular baffle and a second annular baffle disposed radially inwardly thereof, said chamber having an upstream end and an opening downstream into said combustion zone through an opening defined by said baffles;

said first baffle comprising a stationary member and a sleeve member movable relative to said stationary member, each of said members having a plurality of spaced openings therein, said sleeve member being movable between a full open position wherein said openings are aligned, a closed position wherein said openings are offset, and a plurality of partially open positions therebetween, thereby controlling the flow of air therethrough;

means integral with said sleeve member for moving said sleeve member relative to said stationary member;

means for injecting fuel into said premixing chamber;

a compressed air inlet plenum surrounding said premixing chamber and separated therefrom by said first baffle, said plenum communicating with said premixing chamber through said openings to provide for the entry of air to generate a substantially homogeneous vapor phase air-fuel premixture in said premixing chamber for burning in said combustion zone;

said plenum further communicating with the space between said liner and said housing providing for the flow of an air stream into a zone downstream of said combustion zone, the discharge from said premixing chamber after burning in said combustion zone entering said air stream and being mixed therein.

19. The combustor of claim 18 wherein said first baffle further includes means for controlling the flow of said air stream into said zone downstream of said combustion zone simultaneous with the flow of air to said premixing chamber.

* * * * *